United States Patent [19]

Ziolko

[11] 4,060,361
[45] Nov. 29, 1977

[54] EXTRUDER APPARATUS FOR FORMING A TUBULAR CASING

[75] Inventor: Francis Joseph Ziolko, Somerville, N.J.

[73] Assignee: Devro, Inc., Somerville, N.J.

[21] Appl. No.: 541,465

[22] Filed: Jan. 16, 1975

[51] Int. Cl.² .............................................. B29D 23/04
[52] U.S. Cl. .............................. 425/131.1; 425/133.1; 425/376 B
[58] Field of Search ............ 425/133.1, 382 N, 376 B, 425/380, 462, 131.1; 264/173

[56] References Cited

U.S. PATENT DOCUMENTS

| 3,122,788 | 3/1964 | Lieberman | 425/376 B UX |
| 3,221,372 | 12/1965 | Lieberman | 425/376 B UX |
| 3,281,897 | 11/1966 | Mercer | 264/209 UX |
| 3,520,966 | 7/1970 | Soffiantini | 425/133.1 X |
| 3,535,125 | 10/1970 | Fagan | 264/209 X |
| 3,649,143 | 3/1972 | Papesh et al. | 425/133.1 X |
| 3,759,647 | 9/1973 | Schrenk et al. | 425/133.1 X |
| 3,784,339 | 1/1974 | Gmbh | 425/133.1 OR |

*Primary Examiner*—Richard B. Lazarus
*Attorney, Agent, or Firm*—Richard J. Rodrick; Charles A. Harris

[57] ABSTRACT

An edible collagen casing for sausages and the like comprising at least two layers of hardened ropes of collagen wherein the ropes of one layer are helically directed in one direction and the ropes of the other layer are helically directed in the opposite direction and wherein the collagen fibrils and/or fibers in said ropes are, at least on the surface, substantially aligned in the direction of the rope.

A method of making an edible collagen casing for sausages and the like which includes providing at least two collagen gel sources having fibrils and/or fibers therein, dividing each source into a plurality of ropes by subjecting the ropes to mechanical force to thereby orient, at least on the outside surface, the fibrils and/or fibers in the direction of movement of said ropes, directing said ropes into two layers in a tubular form with the ropes of one layer helically directed in one direction and the ropes of the other layer being helically directed in the opposite direction.

An apparatus for making the collagen casing product described above including inner and outer extruder members each having a plurality of orifices for dividing and/or extruding two main sources of gel into a plurality of ropes with the fibrils and/or fibers oriented, at least on the surface, in the direction of movement. Means are provided to direct the two sets of ropes into a tubular form having two layers. There is a passageway between the inner and outer extruders, which are rotating in opposite directions to thereby helically orient the ropes of collagen in one layer in one direction and the ropes of collagen in the other layer in the opposite direction. Means are provided to size the tubular product.

5 Claims, 17 Drawing Figures

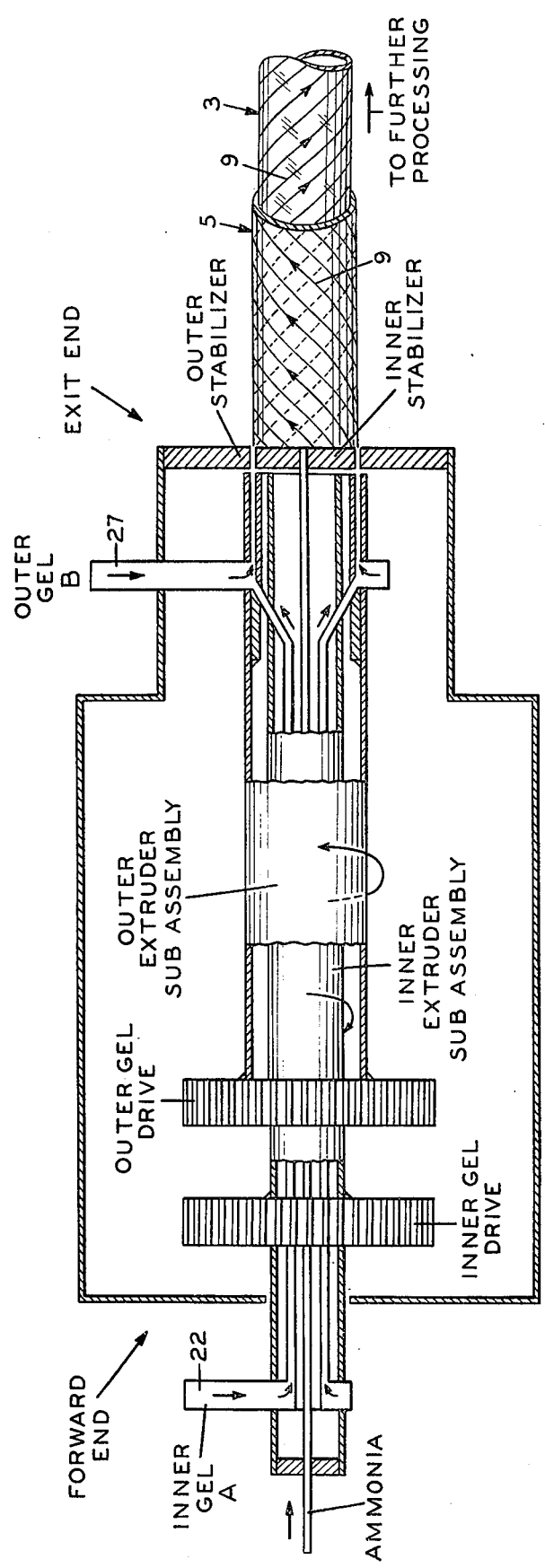
FIG.1.
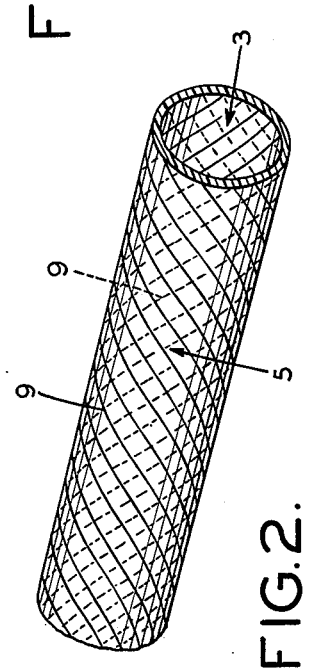
FIG.2.
FIG.2A.

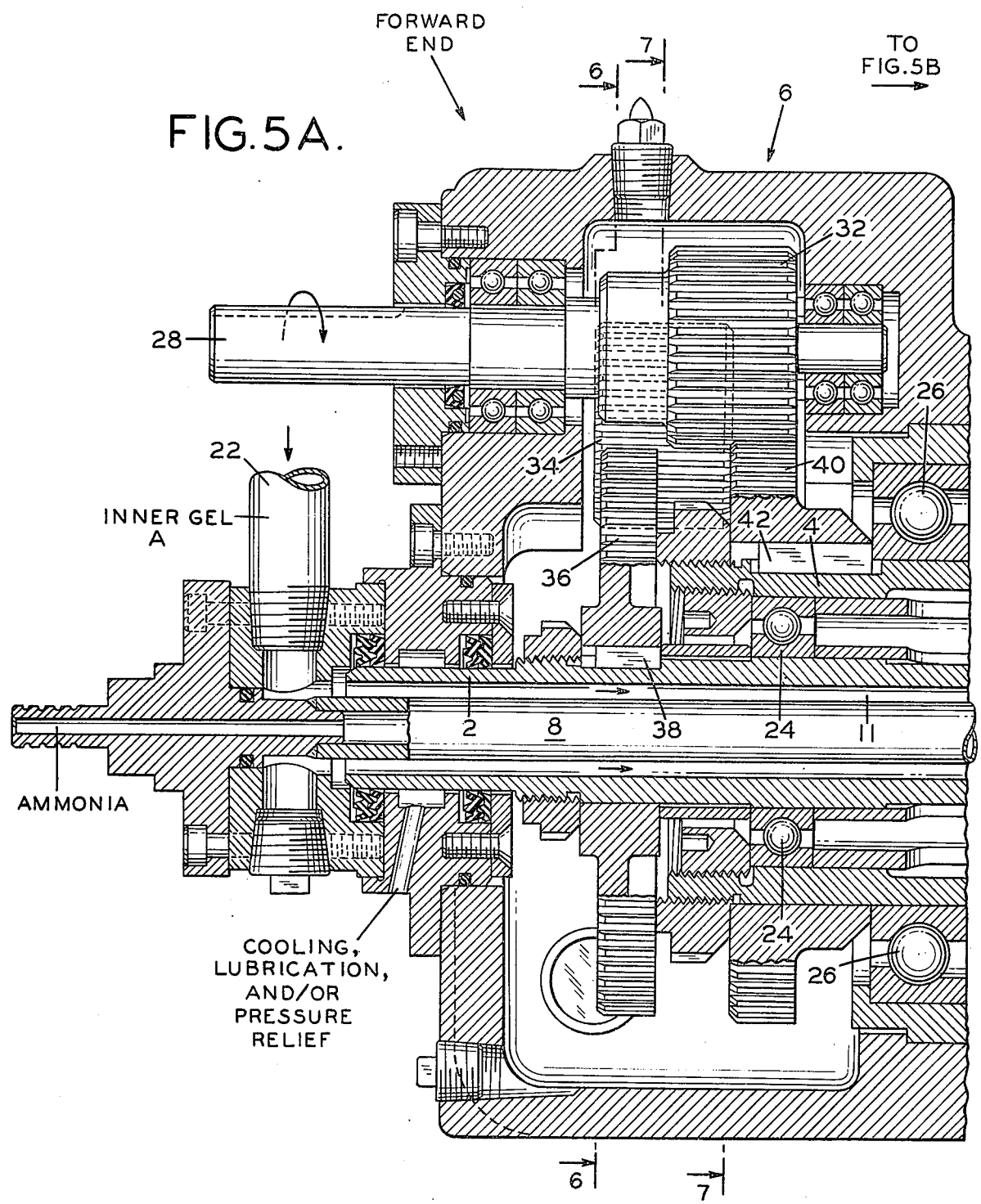

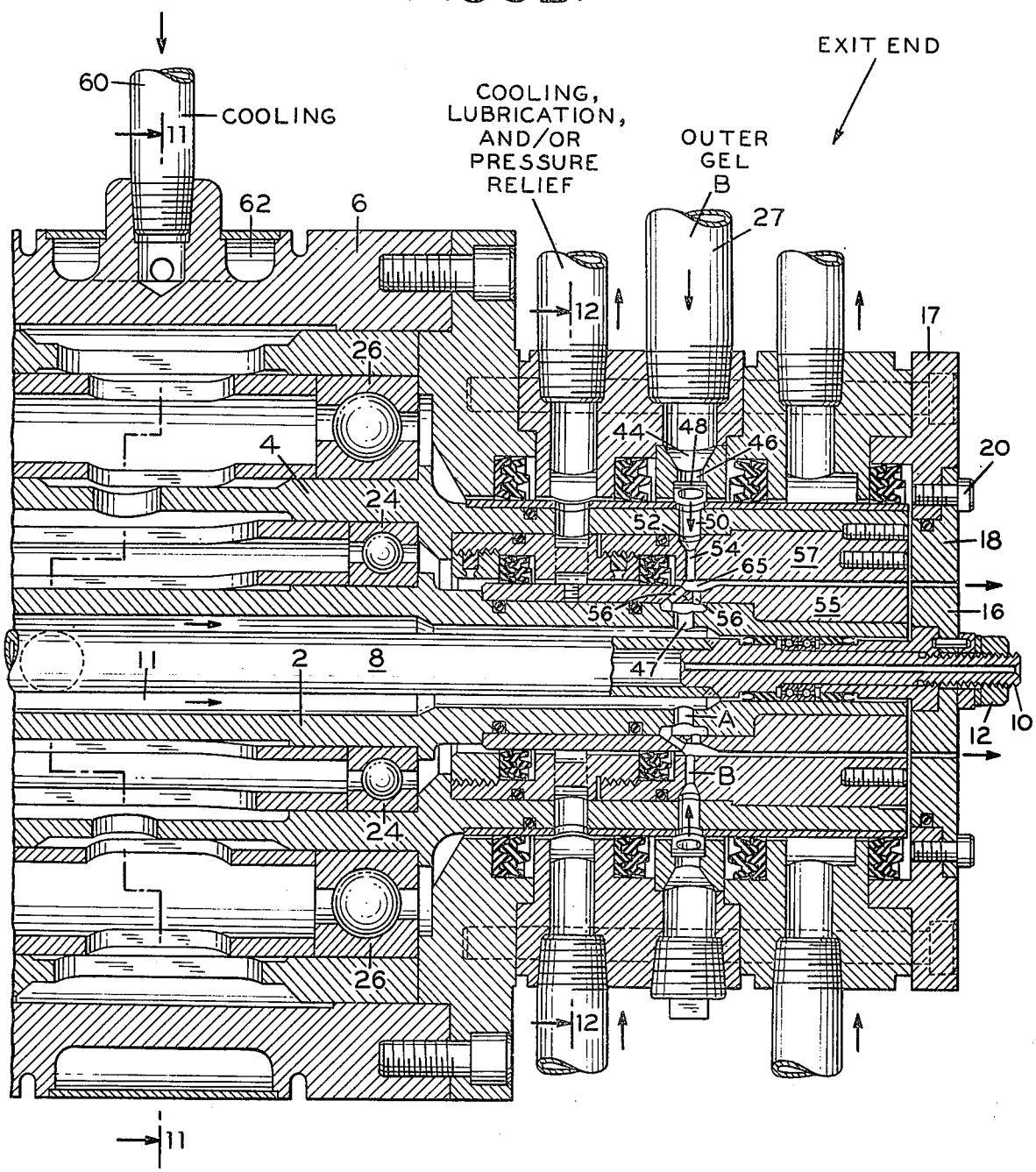

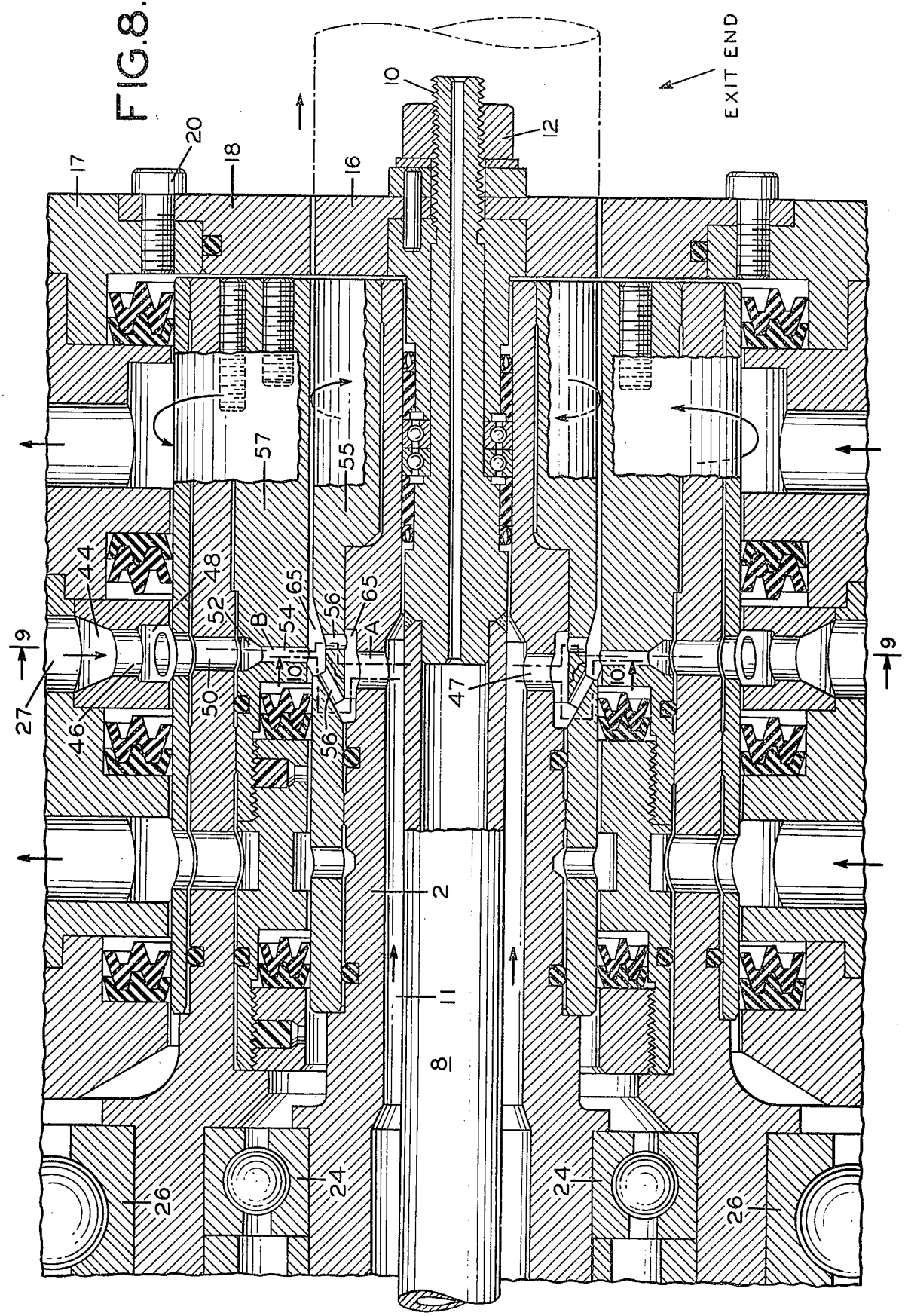

EXTRUDER APPARATUS FOR FORMING A TUBULAR CASING

This invention relates to tubular collagen products such as sausage casings, and more particularly, to improved tubular collagen products and to methods and apparatus for making such tubular collagen products.

The products of the invention, after suitable finishing treatments, are particularly adapted to be utilized as an edible casing for fresh pork sausage which must be cooked before they are consumed, as well as sausages of the weiner or frankfurter type. The latter type sausages are generally processed by being smoked and cooked by the packer and are generally merely reheated before they are consumed. When sausages are provided with edible casings, it is unncessary to remove the casing before the sausage is eaten.

Natural casings produced from the intestines of sheep, hogs and cattle have certain inherent shortcomings including nonuniformity and porosity of casing wall, variations in casing size and edibility, and wide fluctuations in market price and availability. Except for some made from sheep intestines, they are tough and hard to masticate. Also, natural casings are difficult to clean and prepare for human consumption. In addition, the thickness of the wall and diameter of natural casings will vary, causing difficulty during modern high speed stuffing. In view of these deficiences, many attempts have been made to produce better edible casings from protein sources such as collagen.

There are commercially available at this time tubular collagen products such as sausage casing. However, the use of collagen casings in the production of sausages and similar items on extremely high speed automatic equipment has had only limited success. Thus, collagen casings exhibiting tenderness are subject to excessive machine breakage while casings strong enough to machine well are tough and may not be generally acceptable as an edible item.

PRIOR ART PRACTICES

U.S. Pat. No. 3,122,788, granted Mar. 3, 1964, to Emanuel Roy Lieberman describes many of the prior practices to produce tubular collagen products for use as sausage casings. The aforementioned Lieberman patent is specifically directed to an apparatus and method for producing collagen tubing by a continuous extrusion operation and is in commercial use today. It also describes an extruder mechanism and process for making such collagen casings.

It is known to those skilled in the art that collagen has unique rheological characteristics. Thus, when acid swollen collagen gel (sometimes also called "extrusion mass" or "dispersion" in prior art patents) is fed through an extruder, there is a tendency of the swollen collagen fibrils and/or fibers to mat together and become oriented in the direction of the extruder flow. Further, it has been found that when the collagen is formed into a tubular construction, certain orientation occurs which cause the casing to split or tear in the direction of this orientation.

Thus, it has been known that one of the major causes of weak spots in extruded collagen casings is the tendency of the collagen fibrils and/or fibers to become oriented in the direction of collagen flow when such fibrils and/or fibers accidentally encounter an obstacle in their path of travel during extrusion. For example, this characteristic may manifest itself in a generally longitudinal seam or fault in the casing wall.

Another phenomena that occurs in treating swollen collagen material, whether fibrous of fibrillar, is that when a fluid collagen mass undergoes conditions of flow, it is affected in such a manner that it "remembers" the boundary conditions under which it has been flowed. Thus, it has been found that when two such fluid masses are brought into contact with each other, the boundary areas defined by their contacting surfaces continues in the fluid mass and persists even in forms, e.g. tubular, into which such mass is subsequently extruded or otherwise shaped. It has heretofore been thought that the formation of such boundary areas in articles extruded from collagen masses creates areas of weakness which weaken the product formed in this manner.

For example, if a fluid mass of swollen collagen fibrils is caused to flow into an annular cavity, such as by extrusion, from a peripheral inlet whereby the flowing mass is divided and thereafter the divided streams are caused to flow together, the area where the divided streams meet and merge remains in the memory of the material as a persistent boundary area and becomes, in ultimate use, an area of weakness.

The aforementioned Lieberman patent attempted to overcome the foregoing inherent problems and difficulties occuring when the swollen collagen was subjected to extrusion by an extrusion apparatus and method which subjected the swollen collagen mass to forces to effect a random orientation of the collagen to eliminate the above-mentioned problems inherent in extruding swollen collagen. Thus, in the extruder of the U.S. Pat. No. 3,122,788, care is taken to erase the previous memory by using a rotating disk.

THE PRESENT INVENTION

In order to define the invention so that it will be clearly understood, certain terms are used herein which are defined as follows:

The term "rope" refers to the shape of the collagen gel after it has been forced through a small orifice, whereupon in appearance it resembles a rope or a piece of spaghetti in that it is relatively long in relation to its diameter which is relatively small. The fibrils and/or fibers of collagen present on the external surface of the rope will be mainly oriented in the longitudinal direction as a result of the forces to which the collagen gel is subjected to during its passage through the orifice. The collagen fibrils and/or fibers present in the interior portions of the ropes may have any orientation and probably are closest to a random orientation.

The term "layer" as used herein refers to a set or plurality of ropes of collagen gel, which ropes are oriented generally in the same direction as each other and are roughly parallel to each other.

The term "hardened layers" as used herein refers to the layers as they exist in the finished casing. In the hardened layers of the final casing, the collagen, as will be explained in detail subsequently, has been formed into a casing whose thickness is considerably smaller than the diameter of the original ropes. The layers and, more particularly, the ropes of which the layers are formed, during the manufacturing process, have been flattened by the shearing action of two counter-rotating extruders, by the width of the annular space between the extruders, and by the hardening and drying action of the finished casing, so that the ropes in the finished casing are no longer spaghetti-like in appearance, but are somewhat irregular in cross-section. The ropes do not, at this time, exist in discrete form since they have been partially merged in their boundary areas with adjacent ropes and with one somewhat flattened rope perhaps slightly overlapping an adjacent rope. Yet, because of the longitudinal orientation of the majority of the fibrils and/or fibers present on the external surface of the ropes making up the layers, the outline of the ropes remain detectable in the final casing, at least when the casing is wet. Following the process according to this invention the product is subject to further treatment. This further treatment results in a neutralization of the acid swollen gel, a removal of much of its water content, and a hardening of the tubular structure into a casing which is then dried.

The present invention is in direct contrast to the teachings of the aforementioned Lieberman patent.

In accordance with the present invention, no effort is made to obtain random orientation of the collagen fibrils and/or fibers. According to the present invention, the inherent characteristics of swollen collagen, to become oriented and to "remember" or have "memory" is utilized to form a tubular collagen casing which is stronger than casings made according to the aforementioned Lieberman patent and yet is tender and edible. The present invention therefore utilizes what heretofore has been thought of as undesirable characteristics of swollen collagen to form a stronger tubular collagen casing which can be successfully machined on extremely high speed automatic sausage making equipment.

In accordance with the present invention, the swollen collagen is subjected to mechanical force so that the fibrils and/or fibers become oriented in the direction of flow of the collagen. The swollen collagen is, thereafter, formed into a tubular construction wherein the orientation of the fibrils and/or fibers serves to strengthen the tube against bursting or splitting while at the same time remaining edible.

In accordance with the invention, the swollen collagen, sometimes hereafter referred to as the "gel", is provided in the form of an inner gel and an outer gel. To obtain the advantages of the within invention these gels may have identical or different formulations. The inner and outer gels are then subjected to mechanical force, such as by extrusion, so that each of the gels is formed into a plurality of individual ropes of gel. More particularly, the ropes are formed by passing the two gels through counter-rotating extrusion members having a plurality of orifices corresponding in number to the number of ropes to be formed. Typically, each of the gels is formed into a multiplicity e.g. thirty-two, ropes, although more or less ropes may be employed as will be described more fully hereinafter.

When the inner and outer gels are formed into the above-described multiplicity of small ropes, the fibrils and/or fibers in the swollen collagen become oriented in the direction of extrusion. After the outer and inner gels have been formed into the plurality of ropes, the outer and inner gels are brought together to form a single fluid mass having a substantially annular cross-section with ropes from the outer gel being predominantly located adjacent the outer surface of the annulus and the ropes from the inner gel being predominantly located adjacent the inner surface of the annulus. The annular fluid mass of gel is then passed between two counter-rotating cylindrical surfaces to form a tube and then is exited through an annular stabilizing orifice which sizes the tubular product.

During this passage between the counter-rotating surfaces the ropes from the outer gel remain located adjacent the outer surface of the resultant tube while the ropes from the inner gel remain adjacent the inner surface thereby forming a tube comprising an outer layer consisting predominantly of the outer gel and an inner layer consisting predominantly of the inner gel. It has been found that although all the ropes have been united in this space, the memory characteristics of the fibrils and/or fibers prevents such ropes from being destroyed. In fact, upon exit from the two counter-rotating surfaces and the stabilizing annulus, the inner gel ropes will be helically oriented or directed in one direction whereas the outer gel ropes will be helically oriented or directed in the opposite direction. Thus, the resulting tube consists of two layers each containing ropes oriented in opposing directions and forming a net-like structure.

It has been observed that these layers remain discrete layers even after subsequent treatment and that these layers can be separated from one another.

Stated in other words, the inner and outer gels of swollen collagen are each divided into a multitude, e.g. thirty-two ropes by extruding the swollen collagen through two counter rotating series of orifices. As the two layers thus generated are forced through the extruder, they are formed into concentric helices of opposite direction about the longitudinal axis of the casing. As the casing is hardened, the "memory" of these ropes persists and the outline of the hardened ropes may be detected in hardened layers of the finished product. Since the ropes from the inner and outer gel are formed into opposing concentric helices, they appear net-like in the casing wall. The net-like structure so formed permits the two layers to reinforce each other enabling a high stress resistance to be obtained in the finished product.

Thus, in accordance with this invention, even though the two sets of ropes of gels have been brought together to apparently form a single fluid mass of gel while between the counter-rotating surfaces, the inherent characteristics of orientation and memory causes the gels to be discharged from the counter-rotating surfaces in two layers still consisting of the same plurality of ropes into which they were originally formed. Further, the orientation of the fibrils and/or fibers resulting from the extrusion through the small orifices remains despite the additional mechanical work and subsequent treatment of the collagen gel.

In short, the collagen gel is subjected to mechanical force which causes a certain orientation which because of the memory characteristics of the collagen gel persists in the final product.

Thus, the fibrils and/or fibers become oriented along the length of the spaghetti-like rope as a result of being extruded through the small orifices. Next, the layers of ropes are helically oriented in opposite directions as a result of passing between the counter-rotating concentric surfaces. These orientations persist in the final product. However, as noted previously, the ropes tend to become flattened somewhat as a result of passing between the concentric counter-rotating surfaces and as a result of the subsequent treatment. Also, it is possible that as a result of the wiping action of the concentric counter-rotating surfaces some disorientation of the fibrils and/or fibers may occur.

Hence, upon discharge, there will be one layer of ropes helically directed in one direction and a second layer of ropes helically directed in the opposite direction. The helical angle can be controlled to produce any angle in the net-like structure of the casing.

OBJECTS

In view of the foregoing, it is an object of this invention to provide a new and improved tubular collagen casing having a structure resulting in enhanced strength and a method and apparatus for forming the same.

Another object of this invention is to provide a new and improved edible collagen casing for sausages and the like having a unique organization of the collagen fibrils and/or fibers resulting in enhanced strength characteristics and methods and apparatus for making the same.

Another object of this invention is to provide a new and improved edible tubular collagen casing for sausages and the like wherein the casing is formed of a unique net-like structure including two layers of ropes of collagen which are oppositely helically directed and overlapping to form a tubular casing having enhanced strength and methods and apparatus for making the same.

Another object of this invention is to provide a novel method of forming a tubular collagen casing which includes forming two sets of a plurality of ropes by extrusion thereby orienting the fibrils and/or fibers in the direction of movement, uniting said sets of ropes into a single fluid mass and subjecting said mass to counter-rotating surfaces and thereafter forming said stream into a tubular construction where the original groups of ropes are detectable.

A still further object of this invention is to provide an extruder apparatus which includes two counter-rotating extruders each having a series of orifices (memory nozzles) therein which divides the two main gel sources into a plurality of ropes which ropes are discharged from the extruder to form a tubular casing wherein the casing consists of a net-like structure of ropes formed in layers wherein the ropes of said layers are helically directed in opposite directions.

Another object of this invention is to provide a new and novel process for forming collagen gel into a net-like casing for use with sausages and the like.

A further object of this invention is to provide a new and novel extrusion apparatus for forming collagen gel into a casing for use with sausages and the like.

Other objects and advantages of the invention will be obvious or may be learned by practice of the invention, the same being realized and attained by means of the instrumentalities and combinations particularly pointed out in the appended claims.

The invention consists in the novel steps, constructions, arrangements, combinations and improvements herein shown and described.

The accompanying drawings referred to and constituting a part hereof, illustrate an embodiment of the invention and together with the description, serve to explain the principle of the invention.

OF THE DRAWINGS:

FIG. 1 is a diagrammatic flow diagram illustrating, in general, the method of extruding gels in accordance with this invention.

FIG. 2 is a schematic perspective view of a portion of the finished end product of this invention.

FIG. 2A is a schematic end view of the product shown in FIG. 2.

FIG. 5A is a vertical section of the forward portion of the machine, taken generally along line 5A—5A of FIG. 3.

FIG. 5B is a vertical section of the exit portion of the machine, this figure being a continuation of FIG. 5A, and is taken generally along line 5B—5B of FIG. 4.

FIG. 8 is a vertical section of the exit portion of the machine shown in FIG. 5B, drawn to a somewhat larger scale.

GENERAL DESCRIPTION

Figure 4:
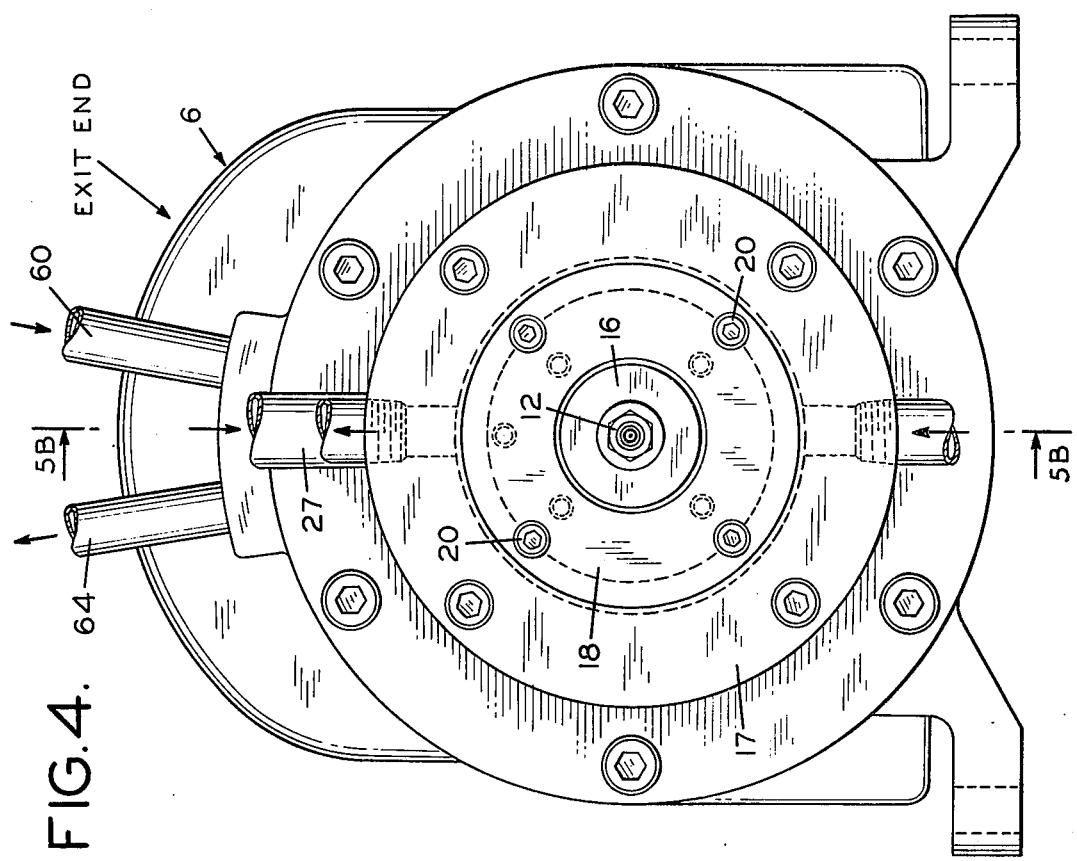
FIG. 4 is an end view of the exit end of the machine.
Figure 3:
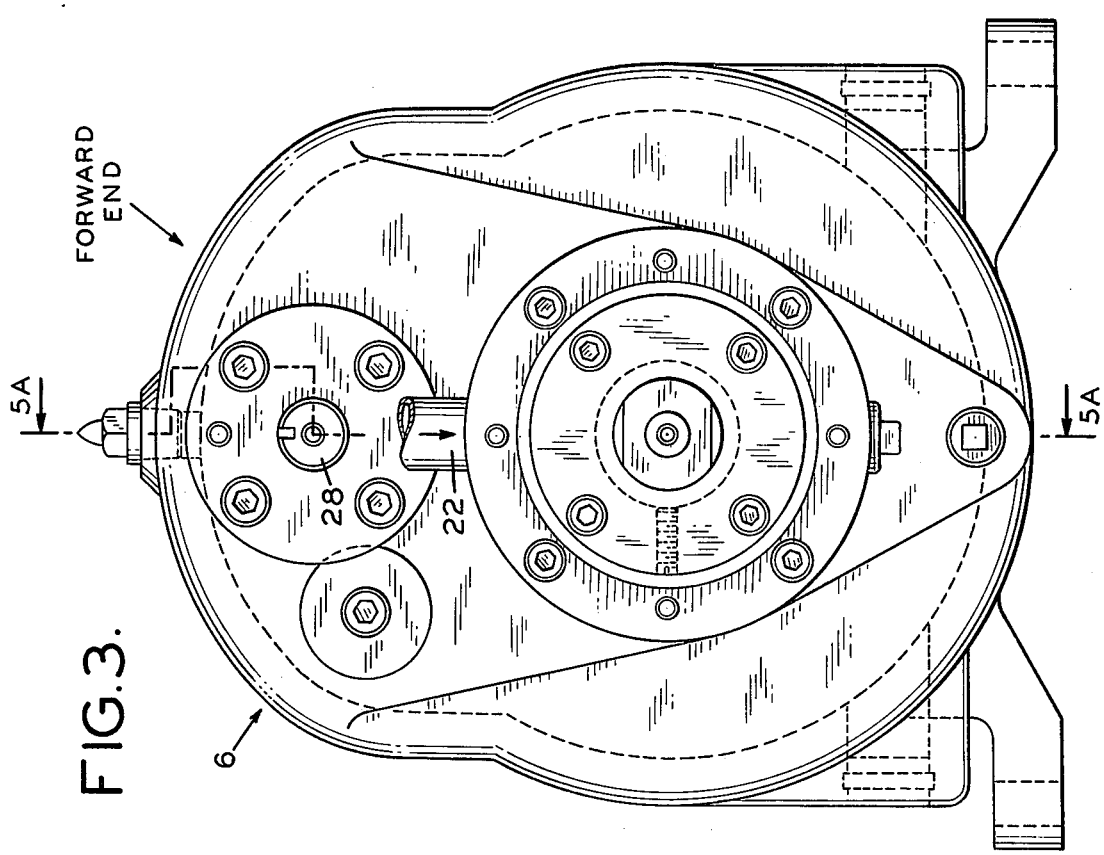
FIG. 3 is an end view of the forward portion of the machine.

For a general understanding of the invention, reference is made to FIGS. 1, 2 and 2A.

In accordance with this invention, the apparatus includes an inner extruder sub-assembly having an inner mandrel and an outer extruder sub-assembly having an outer mandrel. Gear means described subsequently, rotates the inner extruder sub-assembly in one direction (clockwise, as shown in the drawings) and the outer extruder sub-assembly in the opposite direction (counter-clockwise, as shown in the drawings).

The inner gel A is fed to the interior of the apparatus through an inlet located at the forward end of the machine and goes through a circular passageway, one wall of which is the inner extruder sub-assembly, the other wall of which is a stationary tube described subsequently. The outer gel B is fed to the machine through an inlet and is fed to the outer extruder sub-assembly. The inner gel A is directed through two sets of a plurality of orifices generally radially outwardly and the outer gel B is fed through a plurality of orifices generally radially inwardly. Thus, the inner and outer gels are formed into a series of ropes which later are joined into layers and the collagen fibrils and/or fibers become oriented in the direction of flow as a result. As shown in FIG. 1, the two gels come together near the exit of the machine and move for a short distance in the space between the outer and inner extruder sub-assemblies which are rotating in opposite directions and then between an inner and outer stabilizer which forms a stabilizing annulus. The ropes of the inner and outer gels are thus directed in a generally helical direction caused by contact with the surfaces of the inner and outer rotating members. As can be seen in FIG. 1 and 2A, the product being discharged from between the outer and inner stabilizers consists of a net-like structure of layers formed from ropes having oppositely directed helical orientations.

This helical orientation remains even after the tubular collagen product has been subjected to further treatment which results in a neutralization of the acid-swollen gel, a removal of much of its water content, and a hardening of the tubular structure into a casing which is then dried, as can be seen in FIG. 2.

FIG. 2 illustrates the final product showing that the resultant tubular product maintains the helical net-like structure. Thus, as can be seen in FIG. 2A, the final product consists of a net-like structure of two concentric layers 3 and 5 of oppositely helically directed hardened ropes. As there shown by the wavy line 7 where the two layers meet, there may be a relatively small amorphous boundary region where the orientation of the fibrils and/or fibers may be random. At any rate it is clear that the outer layer consists predominantly of outer gel ropes helically directed in one direction and the inner layer consists predominantly of inner gel ropes helically oriented in the other direction.

As shown in FIG. 2, the angle of the helix measured from a line extending along the longitudinal length of the casing is preferably about 35°–50° although this angle can be widely varied if desired.

Different angles may be desired for maximum casing strength depending on particular machines with which the casing will ultimately be used in sausage manufacture, since various machines will place different kinds of stress on the casing.

Basically, however, as shown in FIGS. 2 and 2A, the finished product consists of two hardened layers 3 and 5 with each layer being formed from a plurality of ropes 9 with the ropes of one layer being helically directed in a direction opposite from the ropes in the other layer.

After the tubular product is discharged from the extruder of this invention it is subjected to further treatment such as set forth in U.S. Pat. No. 3,535,125.

The final casing thus prepared contains two layers of ropes of collagen which are now in hardened form. The action of the counter-rotating extruders, the effect of the width of the annular passage, which is less than the diameter of the individual ropes making up the layers, and the hardening and drying steps used to finish the casing result in the ropes present in the hardened layers no longer retaining their original spaghetti-like appearance. Instead, the ropes are somewhat irregular in cross-section and have a more flattened appearance and the ropes are partially merged in the boundary areas with the adjacent rope with one rope overlapping the next. Yet, because of the longitudinal orientation of the majority of fibrils and/or fibers on the external surface of the rope, the outline of the ropes remains detectable, particularly when the casing is wet, in the hardened layers of the casing. Each layer of the casing appears to have a banded effect with the bands being somewhat irregular but roughly parallel and suggestive of the original ropes from which they were prepared. The outer surface of the finished casing is relatively smooth, and does not contain ridges or striations such as in British Pat. No. 1,166,398. Because the orientation which is visible in the hardened ropes forming one layer is in opposed direction to that on the other concentric layer, the tubular structure has a net-like appearance. The structure is not truly a net, however, since there are no holes in the casing walls. The final casing is a laminate (the two layers of the casing actually can be pulled apart by careful manipulation) and looks like a net. Within each layer, the hardened ropes making up the layer have a banded appearance in which, when the casing is wet, there are alternating lighter and darker areas which enables one to visualize the original ropes and their boundaries and to see the net-like appearance of the final casing.

Thus, it will be appreciated that ropes and layers as illustrated in FIGS. 1, 2 and 2A are shown in a somewhat idealized condition whereas in actual practice the ropes tend to flatten out and become merged at their borders.

DETAILED DESCRIPTION

Reference is now made to FIG. 5A, FIG. 5B and FIG. 8.

As shown therein there is a stationary housing or frame 6 on which the remaining elements of the extruder mechanism are mounted. Attached to the frame in any convenient fashion is a hollow stationary member 8. The stationary member 8 is hollow so as to accomodate the passage of ammonia gas which is used in further processing occurring after the tubular collagen is discharged from the apparatus of this invention.

The inner stationary member 8 is threaded 10 at one end for receipt of a nut 12. The nut 12 maintains an inner stabilizer member 16 in fixed position on the frame 6 (FIG. 5B).

The inner stabilizer 16 is immediately adjacent to an outer stabilizer 18 forming a stabilizing annulus. As will be seen, the gel after being extruded between the inner extruder 55 and outer extruder 57 passes between the inner and outer stabilizer as the collagen product is discharged from the extruder mechanism to thereby size the product as it is discharged. The outer stabilizer is attached to the housing flange 17 by any convenient means such as screws 20. The space between the inner and outer stabilizer can be varied depending upon the desired size and/or characteristics of the final product.

Located at the opposite or forward end of the extruder is an inlet 22 through which the inner gel A is fed to the machine (FIG. 5A).

Mounted in inner mandrel bearing 24 is the inner mandrel 2. The inner mandrel 2 is concentric with and spaced from the hollow stationary member 8 to form a passageway 11 for the inner gel A. Inner mandrel 2 and inner extruder 55 together form the inner extruder sub-assembly.

In addition to the inner mandrel 2 there is an outer mandrel 4 mounted on outer mandrel bearing 26. The outer mandrel 4 is mounted so as to be concentric with respect to the inner mandrel 2. Outer mandrel 4 together with outer extruder 57 form the outer extruder sub-assembly.

The outer extruder 57 is spaced from the inner extruder 55 forming a passageway for the gels to pass after the inner gel and outer gels are brought together. The width of the passageway between the inner and outer extruder can vary depending on the desired characteristics of the final product but in one practice was .019 inches. The outer gel is fed to the outer extruder through inlet 27.

Figure 7:
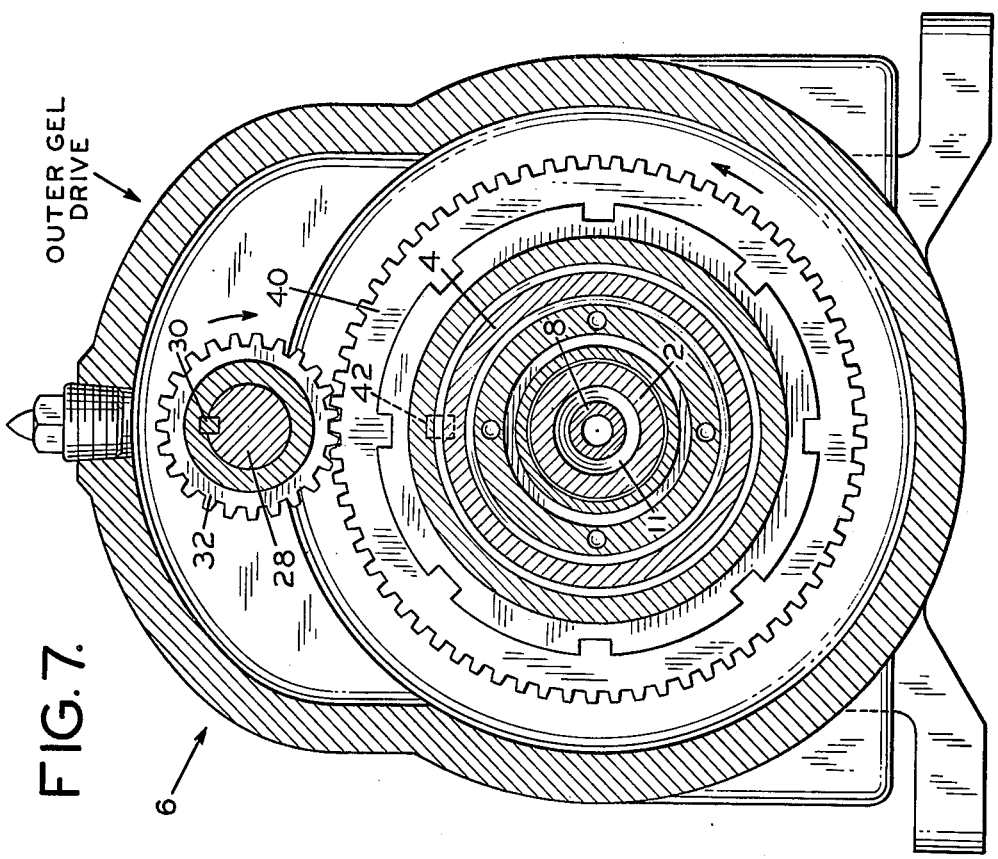
FIG. 7 is a figure similar to FIG. 6, this figure being taken along line 7—7 of FIG. 5A, and shows the drive mechanism for rotation of the outer extruder member.
Figure 6:
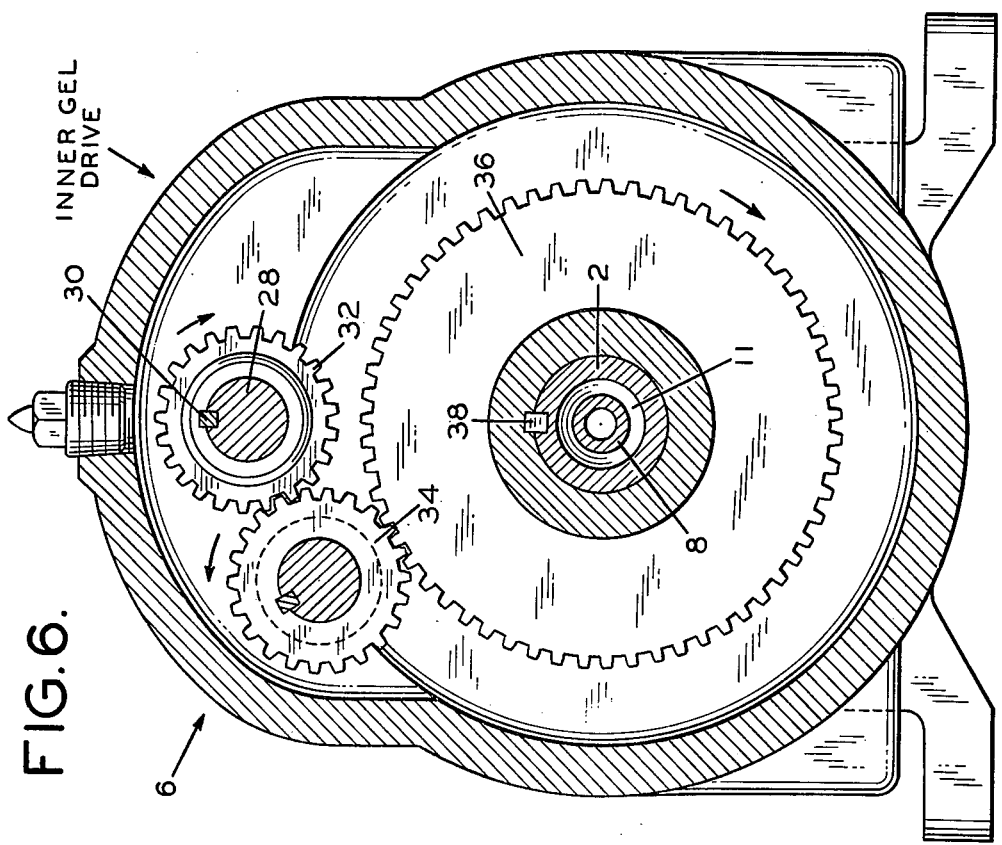
FIG. 6 is a vertical section taken along line 6—6 of FIG. 5A, and shows the drive mechanism for rotation of the inner extruder member.

In accordance with this invention, means are provided whereby the inner and outer extruder sub-assemblies are rotated in opposite directions. This means is best shown in FIGS. 5A, 6 and 7. As embodied there is a drive shaft 28. The drive shaft is rotated by any conventional motor means not shown. The drive shaft 28 is keyed by key means 30 to a relatively wide driving gear 32.

In the case of the inner extruder sub-assembly, the driving gear 32 engages an intermediate gear 34 which in turn engages gear 36 which is attached to the inner mandrel 2 by key means 38 to rotate the inner extruder sub-assembly in a clockwise direction (see FIGS. 1 and 6). On the other hand, driving gear 32 engages gear 40 directly which is attached to the outer mandrel 4 by key means 42, to rotate the outer extruder sub-assembly in a counter-clockwise direction. The direction of movement of the inner and outer extruder sub-assemblies is not important so long as the inner and outer extruder sub-assemblies rotate in opposite directions.

It is not necessary, but is preferable, that the inner and outer extruder members rotate at about the same speed. The helical angle of the streams of collagen in each layer of the casing can be varied by modifying the relative speed of the counter-rotating extruders and the casing extrusion speed.

In accordance with this invention, the inner and outer extruders 55 and 57 have a plurality of orifices therein to extrude both the inner and outer gels into a plurality of ropes. It is the extrusion of the collagen gel through the orifices which orients the fibrils and/or fibers in the direction of extrusion at least in the outer surface of the ropes which make-up the layers, which orientation remains even after subsequent treatment. The memory of these ropes and their oriented fibrils and/or fibers persists in the finished product. The orifices may, therefore, be thought of as memory nozzles.

Figure 9:
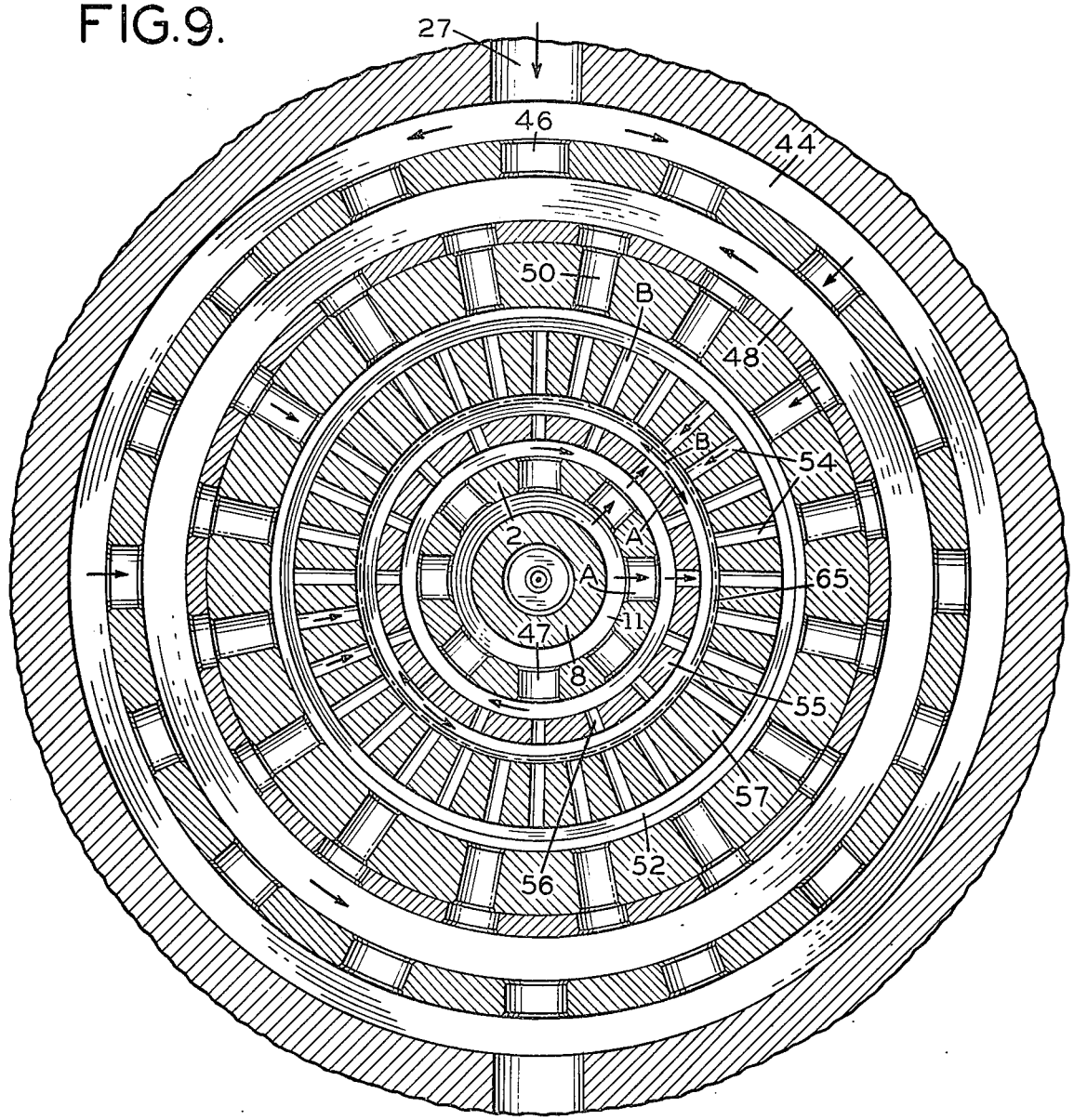
FIG. 9 is a vertical section taken along line 9—9 of FIG. 8.
Figure 10:
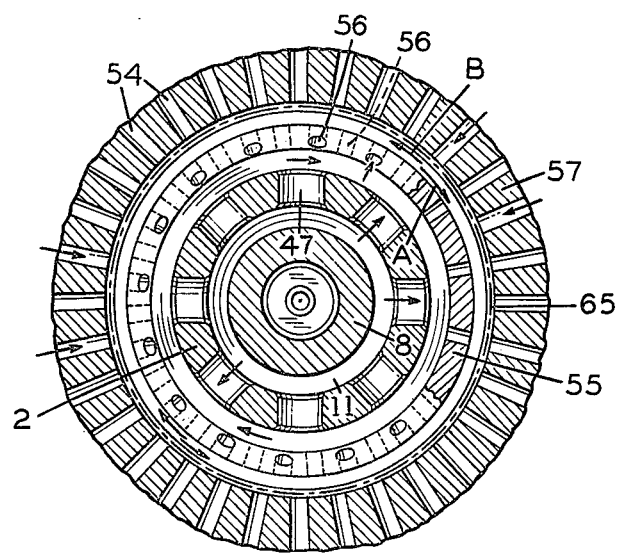
FIG. 10 is a vertical section taken generally along line 10—10 of FIG. 8.
Figure 12:
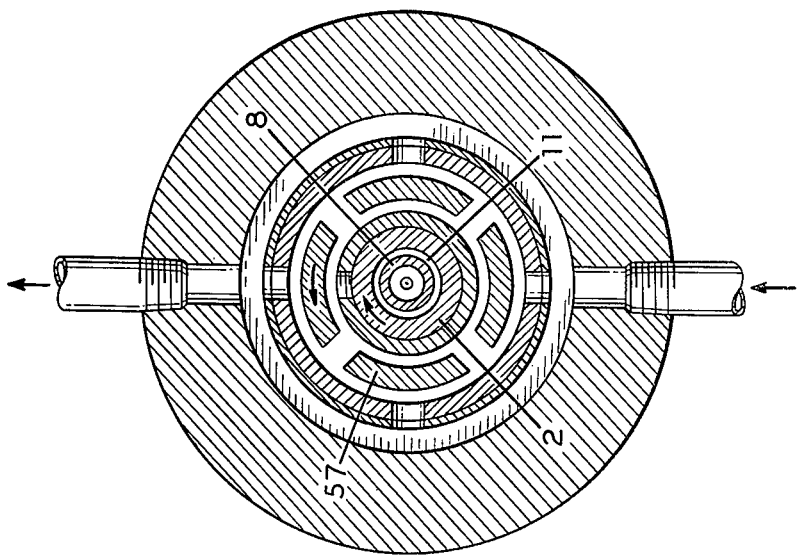
FIG. 12 is a vertical section taken along line 12—12 of FIG. 5B.
Figure 13:
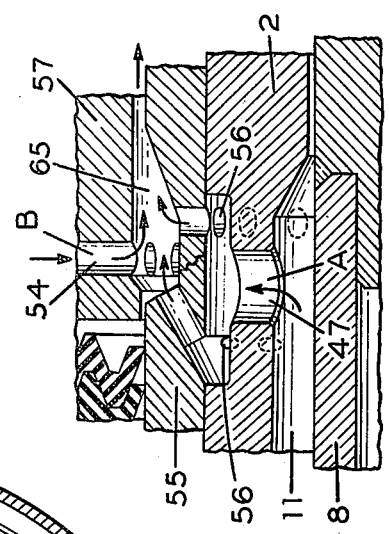
FIG. 13 is an enlarged showing of the area where the inner and outer gels meet for rotation and extrusion.

The specific construction is shown in FIGS. 9 and 10 and FIG. 13.

Turning to FIG. 9, the outer gel enters through inlet 27 into a first manifold 44, through a series of openings 46 to a second manifold 48 through another series of openings 50 to a third manifold 52. The outer gel then passes, as shown by the arrows, through a series of outer gel orifices 54 in outer extruder 57.

As shown, there are thirty-two such orifices but there can be a greater or lesser number of such orifices, the specific number not being a critical factor. Thus, satisfactory collagen casing has been made with sixteen and with twenty-four orifices in the extruder. Possibly even a lesser or greater number of orifices would be satisfactory. In addition, although as illustrated in the drawings, each extruder has the same number of orifices, this is not believed to be a requirement. The outer gel by being passed through the outer orifices 54 is formed into a series of ropes which causes the fibrils and/or fibers to become aligned in the direction of extrusion. The fibrils and/or fibers will "remember" this alignment despite formation of the ropes into layers and subsequent treatment.

The inner gel is extruded through a series of orifices as can be seen in FIGS. 9 and 10. In the case of the inner gel the inner extruder 55 has two sets of orifices 56. As shown, the number of orifices is thirty-two as in the case of the outer extruder but the number could be greater or lesser, the number not being a critical factor.

The greater the number of orifices, the greater the number of ropes in the streams in each layer, and the finer the net-like appearance of the finished casing.

Because of the relatively small diameter of the inner extrusion member, it was found convenient to use two sets of 16 orifices rather than one set of thirty-two. Also, as can be seen from FIG. 13, the sets of orifices are offset rather than in line.

FIG. 13 which illustrates the offset orifices 56 also shows the use of a manifold 65 for receipt of the gel immediately before the gel passes into the passageway between the inner and outer extruders.

The diameter of the orifices in the inner and outer extruders is relatively small and in one practice of the invention was 0.062 inches.

This distance it will be noted is considerably larger than the width of the passageway between the outer and inner extruder. This results, as indicated above, in changing the shape of the ropes somewhat in that they lose their true rope like appearance which they had when being extruded and take on a somewhat flattened form. However, for illustrative purposes, the tubular product shown at the exit of the machine (FIG. 1) is schematic and shown in a somewhat idealized form.

FIGS. 9 and 10, by way of the arrows, illustrate the path of travel of the inner gel A moving radially outwardly of the inner extrusion member whereas the outer gel B moves radially inwardly. The outer and inner gels come together in the space between the inner and outer extruders and move together until discharged. (See FIG. 5B and FIG. 8). While the two gels are moving together, they, in effect, maintain their separate identity in what has been referred to as layers because of the previous extrusion forming the inner and outer gels into separate ropes.

The product is discharged after passing between stationary inner 16 and outer 18 stabilizer members. The inner and outer stabilizers are similar to die members and serve to give the resultant product dimensional stability. As indicated, the space between the inner and outer stabilizers can vary depending on the desired thickness and/or characteristics of the final product. Then the extrudate is subjected to further treatment as described in the prior art and preferably as described in U.S. Pat. No. 3,535,125 which results in forming the hardened layers of ropes which are in the final product.

Figure 14:
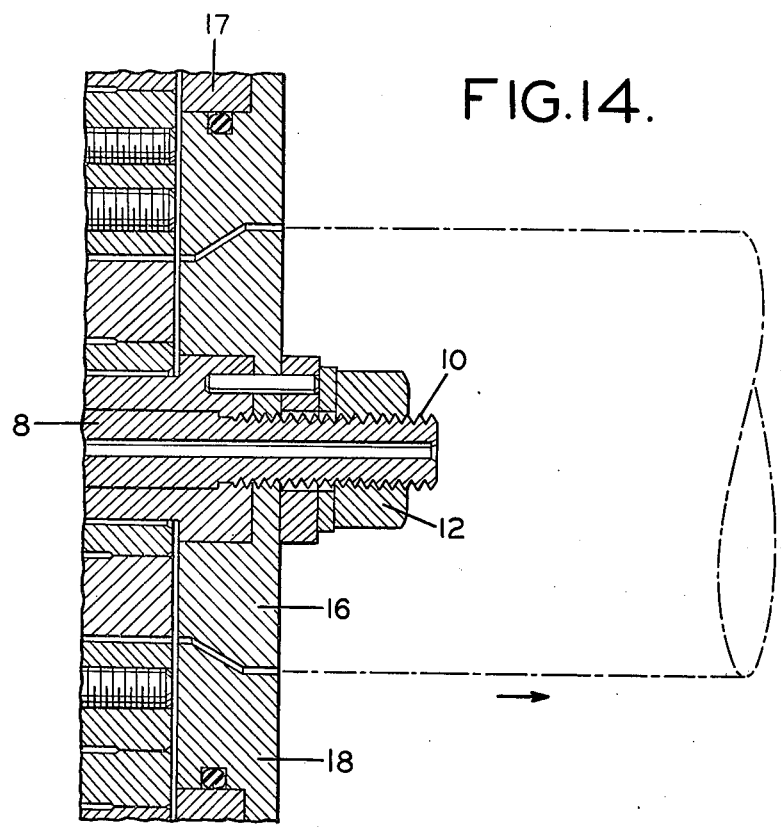
FIG. 14 is a modified form of the stabilizing annulus for the machine.
Figure 15:
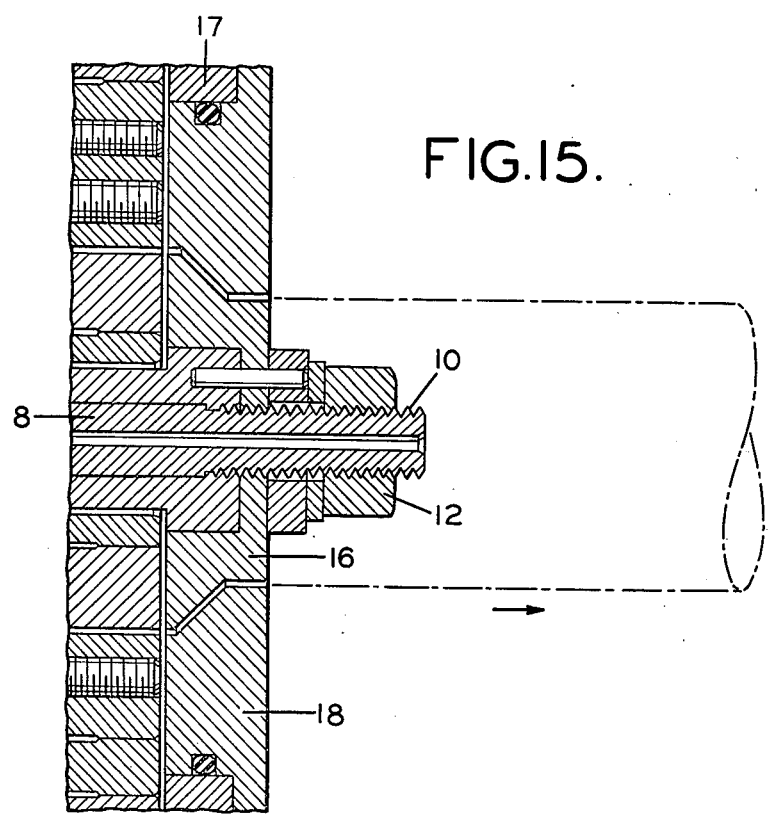
FIG. 15 is another modification of the stabilizing annulus which may be used with the machine.

FIGS. 14–15 illustrate how the diameter of the end product can be varied by changing the path of travel of the gels as they pass between the inner and outer stabilizer. Thus, for example, FIG. 14 illustrates the passageway between the inner and outer stabilizer going generally outwardly so as to increase the diameter of the resultant product. FIG. 15 illustrates the passage between the inner and outer stabilizers going generally inwardly to thereby reduce the diameter of the resultant product. It will be appreciated that because of the attaching means used for the inner and outer stabilizing members, described above, it is a relatively simple matter to change the diameter of the casing product.

Figure 11:
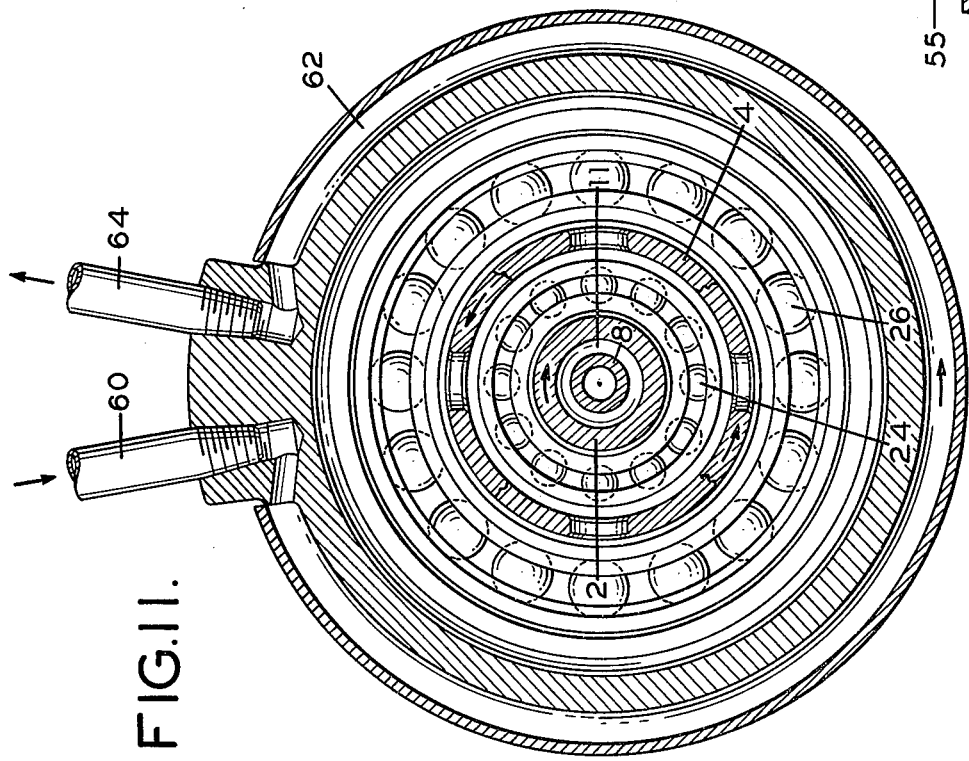
FIG. 11 is a vertical section taken generally along line 11—11 of FIG. 5B.

FIG. 11 illustrates another feature of the invention. There is shown an inlet 60 leading to a cooling passageway 62 which terminates in an exit 64 from which the cooling fluid exits. The drawings also illustrate various vents and cooling, lubrication and/or pressure relief passageways which have been found helpful in the practice of the invention but are not deemed critical and therefore have not been described in detail.

The following example illustrates the advantages of the present invention as compared to prior art practices as exemplified by the aforementioned Lieberman patent.

As used herein, the following terms are defined as follows:

Breaking Strength:

This is the tension in pounds needed to break the casing when a 2 to 3 foot length of casing is stretched to the breaking point with a hand held maximum reading strength guage.

Air Burst Pressure:

This is the air pressure required to break a 2-3 foot length of casing inflated with compressed air until it bursts. The pressure required to burst the casing is measured with a maximum reading pressure guage.

Water Burst Pressure:

This is the water pressure required to burst a 2-3 foot length of casing filled with water at ambient temperature measured on a maximum reading pressure guage.

EXAMPLE I

Unlimed hide as used in commercial collagen casing production was ground to ¼ inch particle size. About 170 Kg. of ground hide was further comminuted in a water slurry through a high-speed rotary cutter. The comminuted slurry (about 500 l.) was mixed with an equal volume of about a 19% cellulose slurry in 0.46% hydrochloric acid. The mixture was homogenized through a two-stage homogenizing valve operated at a pressure of 1,500 psi in each stage. The extrusion mass so formed was held overnight and again homogenized through a two-stage homogenizer operated at 2,000 psi for each stage. After holding 16 to 24 hours, the extrusion mass was filtered through a 9 mil and then a 6 mil wire wound filter and pumped through a single stage homogenizer at a total pressure of 2,500 psi.

The gel so made was fed to an extruder such as that described in the prior art (Lieberman U.S. Pat. No. 3,122,788). The extruder of the prior art was operated with an impeller speed of 175 rpm and tubular casing with a flattened width of 43 to 44 mm was extruded at a speed of about 25 fpm. The casing so extruded was received in inflated form on an endless belt and washed, plasticized, dried and shirred as described in Fagan, U.S. Pat. No. 3,535,125. Approximately, 0.8 gms./min. of ammonia was used on the inside of the casing and 1.6 gms./min. in the exterior chamber to harden the newly extruded casing. The plasticizer consisted of 5.5% glycerin, 1.1% sodium carboxymethylcellulose and 450 ppm of dextrose in water. A thin-coating of mineral oil was applied to the surface after drying and before shirring.

The same gel fed to the prior art extruder was fed to the extruder of this invention and the casing so produced was processed in the same way. The gel stream was split evenly between the two inlets for the inner and outer gel and tubular casing was extruded with a flattened width of 42.5 to 43.5 mm. at 25 feet per minute. The counter-rotating extruder members were each operated at a speed of 105 r.p.m. in opposite directions. The ammonia flows were 1.2 g/min. both inside and outside of the casing. This casing was plasticized in same plasticizer bath and coated with oil as in the case of the prior art casing.

The casing produced by the extruder of this invention has a readily discernable net-like structure formed by the crossing of the helical ropes of the inner and outer layers during extrusion. Before hardening with ammonia, this structure was readily visible to the naked eye. After drying the casing could be examined by filling with water and observing the casing surface. Under these conditions, the net-like structure was again apparent to the naked eye. In this example, the angle of the helical ropes in each layer was about 45° relative to the axis of the casing, or about 90° relative to each other.

Both the prior art casing and the casing of this invention were then heat cured by heating from room temperature to 85° C. over a period of 12 hours and then held at 85° C. for 6 hours. After humidification to a moisture content of about 20 to 40% the following physical properties were measured.

|  | Prior Art Casing | | Net-Like Casing | |
|---|---|---|---|---|
| Width of Flattened Tube | 44.7 | mm | 44.5 | mm |
| Thickness | 1.48 | mil | 1.50 | mil |
| Breaking Strength | 30.2 | lbs | 44.2 | lbs |
| Air Burst Pressure | 16.7 | psi | 19.6 | psi |
| Water Burst Pressure | 8.2 | psi | 8.7 | psi |

Sausages of the frankfurter-type were prepared using a Ty-Linker (Linker Machines, Inc., Newark, N.J., Model 140 ACL).

Five strands (35 foot length) of each of the stuffed casings were double-tied with the following percentage of breaks for the two test casings:

| TEST #1 Sample | Prior Art Casing | Net-Like Casing |
|---|---|---|
| #1 | 0.83 % | 2.5 % |
| #2 | 1.67 % | 0 % |
| #3 | 2.5 % | 0 % |
| #4 | 0.83 % | 0 % |
| #5 | 0 % | 0 % |

In double ty-linking the links are formed by cinching strings into a knot simultaneously at both ends of the link. This action is resisted more successfully by the net-like casing of this invention.

On another day a similar test of more strands from this experiment showed the following percentage of breaks:

| TEST #2 Sample | Prior Art Casing | Net-Like Casing |
|---|---|---|
| #1 | 1.67 % | 0 % |
| #2 | 0 % | 0.83 % |
| #3 | 0.83 % | 0 % |
| #4 | 1.67 % | 0 % |
| #5 | 2.5 % | 0 % |

Using the novel extruder apparatus and generally following the aforementioned example but varying slightly the operating conditions and starting materials, a number of different net-like collagen casings within the scope of the present invention were prepared. These proved highly satisfactory for use on high speed sausage-making machinery, such as; the Townsend semiautomatic DB4A stuffer and linker and the fully automatic Townsend model DB2A. Prior art casings made from substantially identical collagen formulations and under substantially identical conditions, except using the prior art extruders, resulted in excessive breakage when used with such high speed machinery and were considered to have failed badly on such equipment.

This invention, in its broader aspects, is not limited to the specific steps, procedures and elements shown and described but departures can be made therefrom within the scope of the accompanying claims without departing from the principles of the invention and without sacrificing its chief advantages.

I claim:

1. An apparatus for forming a tubular collagen casing comprising:
   a. a stationary frame;

b. a stationary member mounted on said frame;
c. an inner hollow extruder member mounted on said frame, said inner hollow extruder member having a plurality of radially extending orifices therethrough for directing collagen outwardly;
d. means for mounting said inner extruder member on said frame concentric with respect to said stationary member and spaced outwardly therefrom;
e. an outer extruder member having a plurality of radially extending orifices therethrough for directing collagen inwardly;
f. means for mounting said outer extruder member on said frame concentric with respect to said inner extruder member and spaced outwardly therefrom to form a passageway therebetween for merging said collagen of said inwardly and outwardly directions; and
g. means for rotating said inner extruder member in one direction and means for rotating the outer extruder member in the opposite direction.

2. An apparatus as defined in claim 1 wherein the orifices in the inner extruder and the outer extruder are substantially adjacent to one another.

3. An apparatus as defined in claim 2 having an inlet for feeding an inner gel in the space between the inner extruder and the stationary member.

4. An apparatus as defined in claim 1 having inner and outer stabilizer means attached to the frame adjacent the ends of the inner and outer extruder.

5. An extruder apparatus for forming a tubular collagen casing comprising:
a. a frame;
b. inner and outer extruder members mounted on said frame concentric and spaced apart with respect to one another;
c. a plurality of radially extending orifices in the inner and outer extruder members;
d. means for feeding gel radially outwardly through the inner extruder member;
e. means for feeding gel radially inwardly through the outer extruder member whereby said inwardly and said outwardly fed gels are combined in the space between said extruder members; and
f. stabilizer means adjacent the inner and outer extruder members.

* * * * *